Sept. 1, 1953      F. A. TODD      2,650,734
COMBINATION BOTTLE CAP AND POURER
Filed June 27, 1951
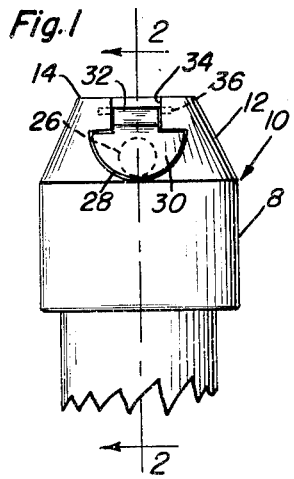
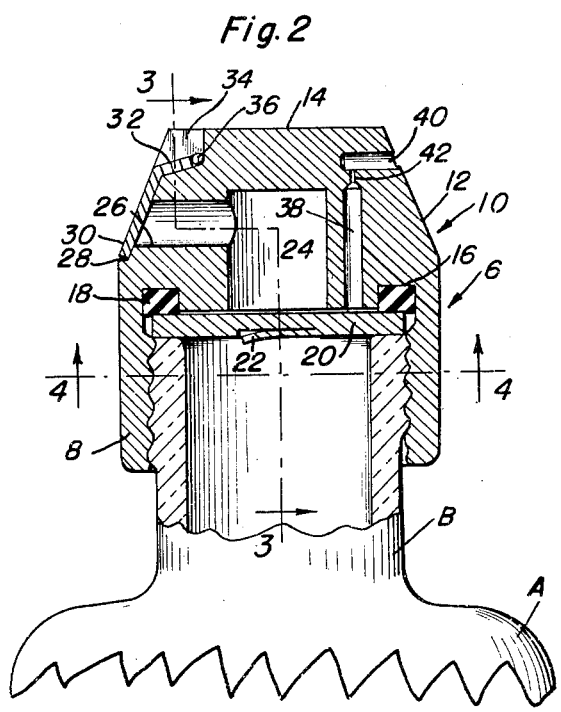
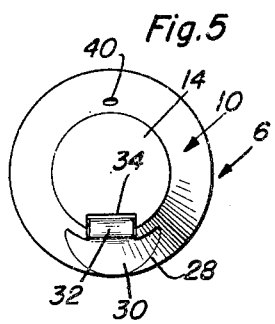
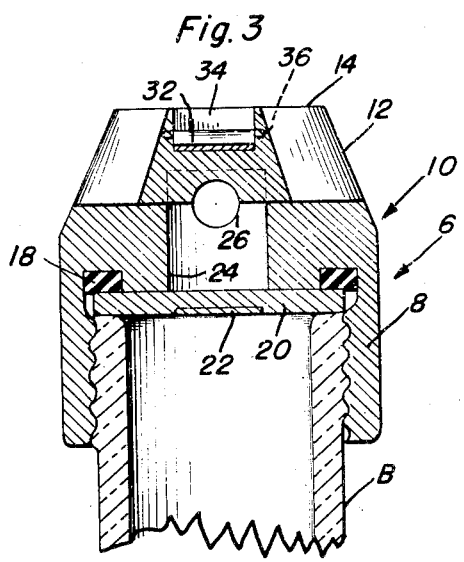
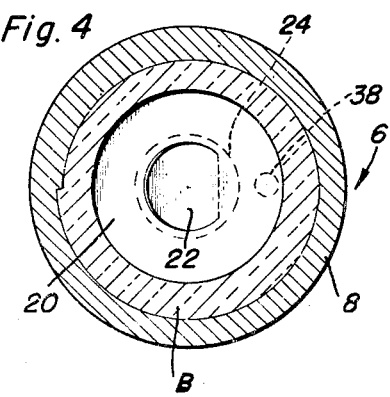
Frank A. Todd
*INVENTOR.*

Patented Sept. 1, 1953

2,650,734

UNITED STATES PATENT OFFICE 2,650,734

COMBINATION BOTTLE CAP AND POURER

Frank A. Todd, McKeesport, Pa.

Application June 27, 1951, Serial No. 233,847

5 Claims. (Cl. 215—40)

The present invention relates to certain new and useful improvements in bottle closures, generally classified, and has more particular reference to a combination cap and pourer, a simple article of manufacture which serves not only to close the bottle at the liquid bottling stage but are thereafter usable as a liquid pourer.

More specifically, the invention has to do with a simple consolidated construction which is structurally novel in that it is easily convertible and therefore is usable, on the one hand, as a cap and is subsequently usable as a liquid dispensing pourer, whereby to thus provide combination bottle closing cap and pourer. In carrying out the invention, a novel two-in-one bottle closure is had and the same, because of its unique construction, functions as a liquid-proof closure for the bottle at the time of bottling and sale and thereafter, by making a slight adjustment in the available parts, then functions as a pourer for the same bottle until the contents are completely disposed of.

A further object of the invention is to provide a simple, practical and efficient combination cap and pourer in which manufacturers and users will find their essential requirements and needs fully met, contained and available and in which, because of progressive functioning possibilities, eliminates the extra expense attached to the acquisition of a separate pourer such as is used, for the most part, at bars, restaurants, and the like. As a bottle cap it is positively leakproof and, as a pourer, it insures smooth and uninterrupted dispensing without gurgle, splash or drip.

The preferred embodiment of the invention is characterized by a cap which hoods over the mouth of the bottle neck and which is preferably, but not necessarily, applied and held in place by screw threads, making up what is therefore an ordinary looking screw-cap. The latter is distinguished from other screw-caps, however, in that an integral head or body portion is provided and the latter is, in turn, provided with a lidded liquid pouring conduit discharging on one side and on an opposite side with a special vent to be hereinafter specifically covered. By using a self contained cork or equivalent sealing disk, the pouring passage is initially covered and thus, in a single, simple cap, both closure and pouring facilities are had.

Other objects and advantages will become more readily apparent from the following description and the accompanying illustrative drawings.

In the accompanying sheet of drawings where- in like numerals are employed to designate like parts throughout the views:

Figure 1 is an elevational view of a combination bottle cap and pourer constructed in accordance with the principles of the present invention;

Figure 2 is a view on an enlarged scale taken at right angles and appearing on the vertical line 2—2 of Figure 1, looking in the direction of the arrows;

Figure 3 is a view on the irregular vertical line 3—3 of Figure 2, looking in the direction of the arrows;

Figure 4 is a cross section on the line 4—4 of Figure 2, looking in the direction of the arrows; and Figure 5 is a top plan view of the structure on the scale appearing in Figure 1.

Briefly summarized the improved article of manufacture herein disclosed has to do with a moldable plastic or equivalent bottle cap which serves initially as a closing cap for a whiskey bottle or the like, and which, after a slight adjustment is made therein, is then converted and serves as a pourer for use by the consumer. It is characterized by a cylindrical body portion having a circular peripheral surface, a closed top surface, a flat annular bottom surface and a skirt integral with the body portion and depending below the bottom surface for removable attachment to a bottle neck. A liquid pouring conduit extends through the body portion and has a discharge end opening through and substantially flush with the peripheral surface and an intake end opening through said bottom surface, the intake end being coaxial with the body portion and substantially larger than said discharge end. An air vent conduit is also formed through the body portion and this has a first axially extending portion opening at one end through the bottom surface, a second radially extending portion with its outer end opening through said peripheral surface at a point substantially opposite to the position of the discharge end of the pouring conduit. These first and second portions of the air vent conduit are of diameters less than the smallest diameter of the liquid pouring conduit and communication is afforded therebetween by a third portion which is in alignment with the first portion, the diameter of the third portion being appreciably less than the respective diameters of the first and second portions with the result that said air vent conduit has an anti-splash air flow constriction so as to minimize clogging and gurgling and, in conjunction with the enlarged intake end, virtually prevents the escape of liquid from the bottle by way of said air vent conduit.

A closure member is provided for the discharge end of the pouring conduit and this, when it is closed, is substantially confined within recess means provided therefor in the peripheral surface limits of the body portion, there being a companion closure member in the form of a readily removable dust-proofing and sealing disc fitting frictionally and held within the cooperating confines of the skirt in a position contiguous to the bottom surface and serving as a cover for the intake end of the pouring conduit, the adjacent end of the first portion of the air vent conduit and the cooperating flat annular bottom surface.

Referring now to the drawings and especially to Figure 2, the reference character A designates the body of a bottle or the like having a pouring neck B which, in the instant disclosure, is externally screw threaded to accommodate a readily applicable and removable screw-type closing cap. The instant invention is, of course, directed to the particular construction of the closing cap which is here denoted by the numeral 6. This cap is to be made of such materials and proportions and shape that regular capping machines which are used in bottling plants as of now may likewise be used in applying the same. It is of proper size and of suitable materials and includes an internally screw threaded attaching skirt 8. The body portion of this improved cap, instead of being made of customary relatively thin proportions, is thickened to provide what takes the form of a truncated conical head 10, including a conical portion 12 and a truncated flat top surface 14. This head or body portion coacts with the depending skirt in such a way as to provide a flat annular bottom surface having a groove 16 which has a packing ring 18 therein, which skirt, in turn, serves to hold in place the dust-proofing disk or equivalent inner seal 20. This disk is provided on its interior, if desired, with a finger grip or flap 22 which is employed for removing the seal in a manner to be hereinafter described. So far, the closure 6, except for the seal and integral body portion, is not especially different from many types of screw and friction caps which are in use. The difference resides partly in building into the head or body portion 10 facilities for venting and pouring. To this end there is an enlarged bore or well 24 which opens through the flat annular bottom surface and communicates with the lateral discharge end 26. These together form a liquid pouring conduit. From the exterior, the conical surface is provided with a shallow recess 28 to accommodate a crescent-shaped cover member 30 for said discharge end. This has a lateral shank 32 with hinge pintles journaled in bearings provided therefor in a second recess 34. The pintles are denoted at 36. With this angularly shaped flap-like lid or cover member, it is obvious that when the bottle is upturned and tilted over to a customary pouring position, the end opens up of its own accord under the forces of gravity. In order to bring the pourer into play, it is necessary to unscrew the cap and to take out or remove the sealing disk 20. Then, when the cap is, minus the disk, replaced, it becomes a pourer, as is obvious. When the bottle is setting up in its usual upright position, the cover member 30 is closed and likewise the pourer is closed.

To avoid having difficulties, an air vent conduit is also provided and this comprises a first axially extending portion 38 which is eccentrically arranged and which has a second radially disposed or extending portion 40 with its outward end opening through the peripheral surface of the body portion at a point substantially opposite to the position of the discharge end of said pouring conduit, said first and second portions being of diameters less than the smallest diameter of said liquid pouring conduit. The latter also includes a third portion in alignment with the first and second portions which afford communication between said portions and the diameter of this third portion, which is denoted by the numeral 42, is appreciably less than the respective diameters of the first and second portions and constitutes an anti-splash air flow constriction. Consequently it serves, in conjunction with the specially constructed pouring conduit, to minimize clogging and gurgling and also serves to virtually prevent the escape of liquid from the bottle by way of the air vent conduit. It will be evident that when the dust-proofing inner seal is removed, the pourer becomes available and at this time the intake end of the liquid pouring conduit and the adjacent end of the first portion of the air vent conduit are both uncovered with the result that a steady flow of liquid from the bottle, when in its pouring position, is assured.

The flow constriction 42 acts as a control restriction or trap that prevents liquid from pouring out the air vent, and also stops choking or gagging of the flow while pouring liquid from the bottle.

It liquid should get in the air vent conduit from the inside of the bottle while it is being dispensed, it is checked or caught in the restriction 42, and returned to the bottle through a vacuum which is created inside the bottle during the process of pouring liquid from the receptacle.

This vacuum created inside the bottle will draw or suck back into the receptacle any liquid momentarily caught in the restriction 42, thus keeping the air vent conduit clear at all times.

If the above restriction was not located as shown, liquids being poured from the bottle through the liquid pouring conduit would have a tendency to flow through the air vent conduit, thus stopping the air intake and causing the liquid, upon being poured to choke up, gurgle, splatter, and quit pouring altogether.

As previously stated, this two-way closure eliminates the extra expense of acquisition of a pourer and is indeed a satisfactory two-in-one construction. When the user wishes to make use of the bottle pourer, he merely removes the screw-cap, in an obvious fashion, lifts out the seal or cork, and puts the cap back and it is then ready to function as a free flowing satisfactory closure.

It will be clear that this combination cap and pourer (when tilted) will pour from any position. The "up" and "down" movement eliminates waste, gurgle, hesitation and stoppage, assuring a smooth continuous flow.

There are four simple steps involved in the proper usage of the dual or convertible cap and pourer. These steps are as follows:

(1) Remove air tight cap from bottle. (2) Remove seal (inside disk) with point of knife puncturing center and flipping it out. If seal is to be re-used and replaced do not puncture center but insert knife under end of seal and flip out. The "cap" is now a "pourer." (3) Replace cap on bottle. (4) Insert point of knife under pouring flap to release it for steady use. To reduce evaporation of slow moving products, the tab on the flap can be pressed back into the pouring spout of the pourer. If a number of glasses are to be filled place glasses close together to fill and start pouring, do not raise bottle after each filling, simply place your index finger over the air vent to stop pouring and quickly move to another glass and remove finger for each filling.

It is thought that persons skilled in the art to which the invention relates will be able to obtain a clear understanding of the invention after considering the description in connection with the drawings. Therefore, a more lengthy description is regarded as unnecessary.

Minor changes in shape, size and arrangement of details coming within the field of invention claimed may be resorted to in actual practice, if desired.

Having described the invention, what is claimed as new is:

1. A combined bottle cap and pourer comprising an integral body portion having a circular peripheral surface, a closed top surface, a flat annular bottom surface and a skirt integral with said body portion and depending below said bottom surface for removable attachment to a bottle neck, a liquid pouring conduit through said body portion having a discharge end opening through and substantially flush with said peripheral surface and an intake end opening through said bottom surface, said intake end being coaxial with the body portion and substantially larger than said discharge end, an air vent conduit through said body portion having a first axially extending portion opening at one end through said bottom surface, a second radially extending portion with its outward end opening through said peripheral surface at a point substantially opposite to the position of said discharge end of said pouring conduit, said first and second portions being of diameters less than the smallest diameter of said liquid pouring conduit, and a third portion in alignment with said first and second portions and affording communication therebetween, the diameter of said third portion being appreciably less than the respective diameters of said first and second portions and constituting an anti-splash air flow constriction, whereby to minimize clogging and gurgling, and serving to virtually prevent the escape of liquid from the bottle by way of said air vent conduit.

2. The structure defined in claim 1 and the combination therewith of a closure member pivotally mounted on said body portion and, when closed, being wholly confined within the peripheral surface limits of said body portion and normally closing the discharge end of said liquid pouring conduit, and an imperforate bodily removable dust-proofing and sealing disc fitted into and frictionally held within the encircling confines of said skirt in a position contiguous to said bottom surface and constituting a cover for the intake end of the pouring conduit, the adjacent end of the first portion of said air vent conduit, and said flat annular bottom surface.

3. The structure defined in claim 2, wherein the bottom surface is provided, at the juncture of the skirt and body portion, with an endless groove, a compressibly resilient packing ring lodged in said groove, said packing ring being of a cross-section greater than the depth of the groove and having its bottom side depending below the plane of said bottom surface, and the adjacent marginal edge portion of said sealing disc contacting and protectively covering said bottom side.

4. The structure defined in claim 1, wherein the peripheral surface of one side of the said body portion has a recess therein, the discharge end of said pouring conduit registering with said recess, and a sanitizing and evaporation preventing closure member for said discharge end pivotally mounted on said body portion, said member, when closed, being received completely within said recess and being wholly confined within the limits of the peripheral surface of said body portion.

5. A combined bottle cap and pourer comprising an integral body portion having a circular peripheral surface, a recess therein, a closed top surface, a flat annular bottom surface, a skirt integral with said body portion and depending below the plane of said bottom surface for attachment to a bottle neck and for forcing a sealing disk against said neck, said bottom surface, at the juncture of said body portion and skirt being provided with an endless groove for reception of a packing ring, a liquid pouring conduit having a radial discharge end opening into said recess and terminating short of the peripheral surface and having an intake and opening through said bottom surface, said intake end being coaxial with said body portion and substantially larger than said discharge end and providing a well, an air vent conduit through said body portion opening at one end through said bottom surface and at its opposite end extending radially and opening through the peripheral surface at a point substantially opposite to the discharge end of the liquid pouring conduit, and a closure member operatively mounted on said body portion and when closed, being received in said recess, whereby no portion of the then closed closure member projects beyond the peripheral surface of the body portion.

FRANK A. TODD.

References Cited in the file of this patent

UNITED STATES PATENTS

| Number | Name | Date |
|---|---|---|
| 749,385 | Kahlmus | Jan. 12, 1904 |
| 1,366,289 | Silverthorne | Jan. 18, 1921 |
| 1,390,549 | Silverthorne | Sept. 13, 1921 |
| 1,606,395 | Bird | Nov. 9, 1926 |
| 1,779,843 | Gerstle | Oct. 28, 1930 |
| 2,099,292 | Brown | Nov. 16, 1937 |
| 2,108,583 | Falk | Feb. 15, 1938 |
| 2,136,123 | Baron | Nov. 8, 1938 |
| 2,197,352 | Terkel | Apr. 16, 1940 |
| 2,286,906 | Gaines | June 16, 1942 |
| 2,362,905 | Kuhlman | Nov. 14, 1944 |
| 2,500,199 | Nesset | Mar. 14, 1950 |
| 2,511,429 | Clare | June 13, 1950 |
| 2,546,194 | Livadas | Mar. 27, 1951 |

FOREIGN PATENTS

| Number | Country | Date |
|---|---|---|
| 805,235 | France | Aug. 17, 1936 |
| 204,207 | Switzerland | July 17, 1939 |